United States Patent
Clinton

[15] 3,684,169
[45] Aug. 15, 1972

[54] AUTOMATIC BY-PASS FLOW CONTROL

[72] Inventor: Harry M. Clinton, Northridge, Calif.
[73] Assignee: Swimrite, Inc., Van Nuys, Calif.
[22] Filed: March 2, 1971
[21] Appl. No.: 120,251

[52] U.S. Cl. ..................................................236/20
[51] Int. Cl. ..........................................G05d 23/00
[58] Field of Search..........................236/20, 92, 93

[56] References Cited

UNITED STATES PATENTS 3,404,837  10/1968  James....................236/34.5
3,554,440  1/1971   Austin....................236/34.5

*Primary Examiner*—Edward J. Michael
*Attorney*—Fulwider, Patton, Rieber, Lee & Utecht

[57] ABSTRACT

A swimming pool heater having a by-pass control including a spring-loaded by-pass valve formed by a hinged valve plate, and means for increasing and decreasing the spring force tending to close the by-pass valve in response to changes in the temperature of the flow out of the heater, thereby to avoid overheating as a result of an input pressure drop or an input temperature rise. The temperature-responsive means include a heat-expansible and contractible member connected to a base element for the spring, and two spring return units for assisting in relieving the spring force as the member contracts.

6 Claims, 3 Drawing Figures

PATENTED AUG 15 1972
3,684,169
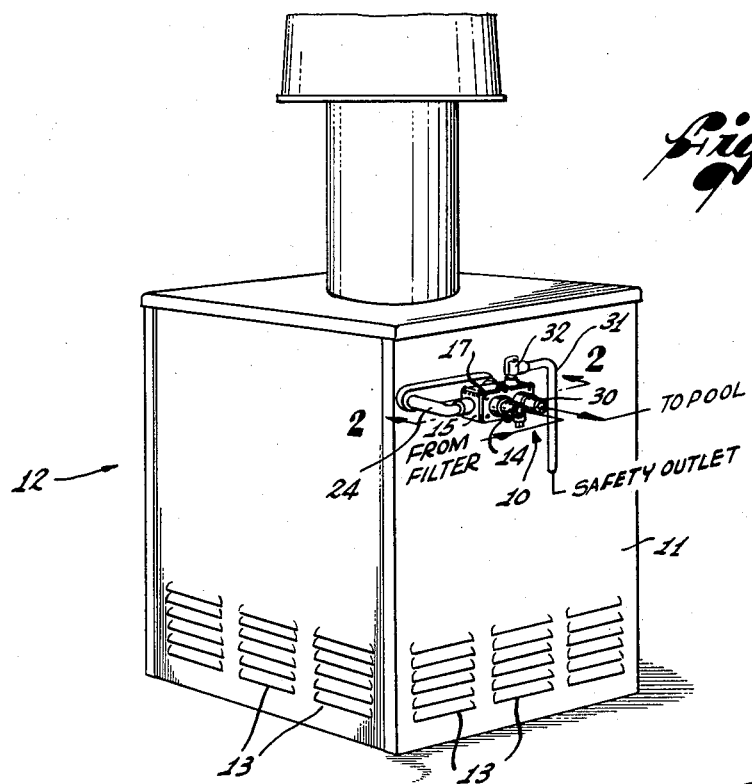
Fig.1
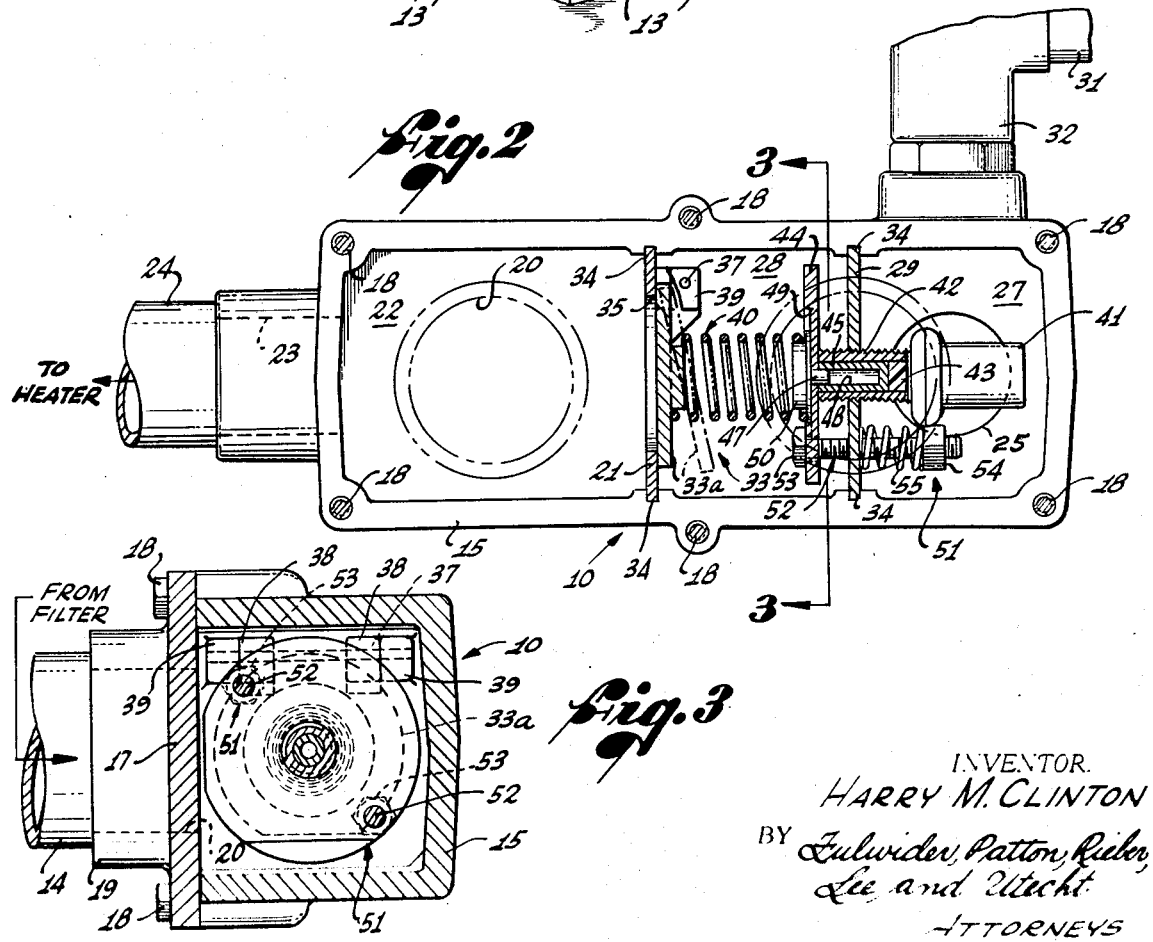
Fig.2
Fig.3
INVENTOR.
HARRY M. CLINTON
BY Fulwider, Patton, Rieber, Lee and Utecht
ATTORNEYS

AUTOMATIC BY-PASS FLOW CONTROL

BACKGROUND OF THE INVENTION

The present invention relates to the control of a flow of fluid into a heater for heating of the fluid prior to delivery thereof to a using system and, more particularly, to an automatic by-pass flow control for a heater of the type used to heat the water of a swimming pool or the like.

In such a system, water is withdrawn from the pool by a pump which typically forces the water through a filter and then through the heater, where the temperature is raised to the desired extent before the water is returned to the pool. The capacity of the heater is selected according to the exposed surface area of the pool to be heated and the average temperature differential between the water and air temperature during the coldest period of intended usage. When the heater is in operation, a substantially constant rate of flow through the heater is maintained, and a substantially constant temperature rise is produced.

As a result of differing operating conditions in the system, however, the input pressure at the heater is subject to variations which tend to produce different rates of flow of fluid through the heater. Moreover, the input temperature also varies because of differing atmosphere conditions. Accordingly, in the absence of special controls, the operating temperature in the heater can rise to excessive levels as a result of a reduction in the flow rate or of an increase in the input temperature, and such excessive temperature levels adversely affect the life of the heater over prolonged periods of use.

For this reason, prior heaters have been equipped with automatic by-pass controls which have pressure-responsive by-pass valves for maintaining the input pressure substantially constant, and which also have sensing elements responsive to the temperature of the fluid leaving the heater to adjust the input pressure in accordance with variations in this temperature. Such controls maintain the rate of flow through the heater substantially constant while the input temperature is substantially uniform, and either increase or decrease the flow rate as required to accommodate variations in input temperature without excessive variation in the operating temperature within the heater.

With such prior controls, however, operating problems have been encountered, primarily problems with jamming of the by-pass elements or sensing elements resulting in loss of pressure response, temperature response, or both. These problems may be attributable to fouling of the by-pass valve by the accumulation of deposits from the water, or to malfunctioning of the temperature-responsive means, and the primary objective of this invention is to provide a novel automatic by-pass control which effectively overcomes such operating problems and is virtually trouble-free over prolonged periods of service use.

SUMMARY OF THE INVENTION

The present invention resides in an improved automatic by-pass control for swimming pool heaters and the like, for more reliably responding to changes in temperature and pressure in the system, and thereby more effectively accomplishing the purposes for which the control is designed.

More specifically, and as shown in the preferred embodiment illustrated and described herein, the improved by-pass control comprises a manifold mountable on the heater to be controlled, and defining inlet and outlet chambers for flows of fluid into and out of the heater, and also defining a by-pass chamber for a variable flow of fluid around the heater to the using system. A spring-loaded by-pass valve maintains a preselected normal input pressure in the inlet chamber when the output temperature is at an approximate, normal level, by bleeding excess fluid from the inlet chamber to the by-pass chamber, and the temperature responsive sensing means reliably adjusts the spring loading of the by-pass valve to vary the input pressure according to sensed variations in output temperature in the outlet chamber.

This is accomplished by a back-and-forth moving actuating element of the sensing means, connected to a base element of the loading spring to increase the spring force on the by-pass valve as the temperature rises, thereby reducing the by-passed flow and increasing the input to the heater. As the output temperature decreases, novel return means move the actuating element back, so that the base element is positively moved, independently of the actuating element, in a direction to reduce the loading force and increase the by-pass flow.

In the preferred embodiment, the novel actuating and return arrangement is combined with a by-pass valve in the form of a closure plate that is hinged on a partition separating the inlet chamber from the by-pass chamber, so as to swing away from the partition within the by-pass chamber as the valve is opened, and the loading spring extends from this closure plate across the by-pass chamber toward the outlet chamber. The base element for the spring is disposed in the by-pass chamber in engagement with the end of the spring, remote from the valve. A connecting element extends from the base element through another partition into the outlet chamber, and the return means comprise at least one, and preferably two, yieldable spring units acting between the base element and a partition between the by-pass and outlet chambers to urge the base element toward the outlet chamber.

Other objects and advantages of the invention will become apparent from the following detailed description taken in conjunction with the accompanying drawings.

BRIEF DESCRIPTION OF THE DRAWINGS

FIG. 1 is a fragmentary perspective view of a swimming pool heater equipped with an automatic by-pass control embodying the novel features of the present invention;

FIG. 2 is an enlarged fragmentary cross-sectional view of the by-pass control taken substantially along line 2—2 of FIG. 1, with internal parts broken away and shown in cross-section and with the positions of openings in the removed cover plate indicated in broken lines; and FIG. 3 is a fragmentary cross-sectional view of the by-pass control, taken substantially along line 3—3 of FIG. 2.

DETAILED DESCRIPTION

As shown in the drawings for purposes of illustration, the invention is embodied in an automatic by-pass control 10 that is mounted on one side 11 of a heater 12 for heating water withdrawn from a swimming pool (not shown) prior to return of the water to the pool. As shown, the heater is simply a box-like cabinet having vents 13 adjacent the bottom of each side, and the by-pass control is externally mounted on the cabinet adjacent the upper edge of the side 11 thereof.

Water to be heated typically is withdrawn from the pool by means of a circulating pump which forces the water through a filter to remove most of the foreign particles therefrom, and then is fed to the heater through a pipe 14 leading to the by-pass control. As shown most clearly in FIGS. 1 and 3, the by-pass control 10 herein comprises a hollow, box-like manifold 15 having an open front side (as shown in FIG. 2) that normally is closed by a rectangular cover plate 17 secured to the manifold by several screws 18. The supply pipe 14 from the filter opens into the manifold through a fitting 19 (FIG. 3) on the cover plate 17 adjacent one end of the latter, the left end in FIG. 1, and through a port 20 in the cover plate opening into the left end portion of the manifold, as shown in FIG. 2.

A partition 22 extends transversely across the manifold 15 on the right side of the port 20, and forms an inlet chamber 21 in the left end portion of the manifold, from which at least part of the incoming water flows through a port 23 in a fitting on the left end of the manifold and into a pipe 24 leading to the heater. The water supplied to the heater through this pipe circulates through the heat exchanger (not shown) within the heater, and then exits from the heater as heated water.

This heated water is returned to the manifold 15 through an outlet port 25 in the back wall of the manifold, opening into an outlet chamber 27 in the right end portion (FIGS. 1 and 2) of the manifold, separated from the central portion 28 by a second partition 29. From the outlet chamber, the heated water flows into a pipe 30 (FIG. 1) for carrying the water back to the pool. A safety outlet pipe 31 is connected to the top of the manifold above the outlet chamber 27 and normally is closed by a safety valve at 32.

As previously mentioned, the pressure of the water delivered to the manifold 15 through the pipe 14 and the inlet port 20 is subject to substantial variations as a result of changing filter conditions. Primarily for this reason, a by-pass valve 33 (FIG. 2) is provided in the manifold to variably bleed excess flow from the inlet chamber 22 and thereby maintain the pressure in the inlet chamber, and the resulting flow through the pipe 24 to the heater, substantially constant.

For this purpose, the central portion 28 of the manifold constitutes a by-pass chamber which is defined between the two transverse partitions 21 and 29, which preferably are removably mounted in grooves 34 (FIG. 2) in the top and bottom walls of the manifold. A by-pass port 35 is formed in the partition 21 to permit fluid to flow from the inlet chamber 22 to the by-pass chamber 28, and the by-pass valve 33 includes a closure plate 33a that is disposed in the by-pass chamber and movable toward and away from this port to control the effective flow area through the port. The by-passed flow then preferably is mixed with the flow from the outlet chamber, for return to the pool.

In the preferred embodiment of the invention, this closure plate 33a is hinged on the partition 21 on the upper side of the by-pass port 35 to swing between open and closed positions, thereby avoiding problems of fouling that have occurred in other by-pass controls as a result of fouling of the mountings for reciprocating closure plates. Herein, the hinge is formed by a pin 37 fast in two spaced lugs 38 (see FIG. 3) on the plate and rotatably received at its ends in two lugs 39 fast on the partition and straddling the lugs 38.

To apply a selected closing force to the closure plate 33a and thereby determine the pressure at which the by-pass port 35 is opened to bleed fluid from the inlet chamber 22, a spring 40 (FIG. 2) is arranged to urge the plate toward the partition 21 and to yield when the pressure in the inlet chamber exceeds a given level. Accordingly, when the pressure exceeds this level, the port is opened to bleed out the excess fluid being delivered to the inlet chamber by the filter, thereby maintaining the pressure approximately at that level. After the port has been opened, a further increase in input pressure will result in further opening of the port, while a decrease results in a gradual closing of the port and a correspondingly gradual throttling of the by-pass flow. Thus, this valve maintains the input pressure substantially constant despite variations in the pressure of fluid from the filter.

To avoid any objectionable increase in operating temperature within the heater 12 as a result of a marked increase in input temperature, as could occur during a hot spell in the weather, means are provided for sensing a rise in the output temperature above a normal range of temperatures and increasing the closing force exerted by the spring in response to such a temperature rise. In this manner, the pressure in the inlet chamber 22 is increased to increase the flow through the heater.

As shown in FIG. 2, the sensing means include a heat-conductive casing 41 disposed in the outlet chamber 27 to be exposed to the temperature of fluid flowing therethrough, a hollow supporting stud 42 threaded through a tapped opening in the partition 29 with the casing secured to its right end, and a thermally expansible and contractible actuating member 43 supported within the casing 41 and movable back and forth longitudinally of the stud 42 in response to changes in the temperature to which the member is exposed. In this instance, the actuating member, which may be composed of various materials, expands along the hollow interior of the stud 42 when heated, moving toward the by-pass chamber 28, and contracts away from the by-pass chamber when cooled.

To utilize this back-and-forth motion to vary the loading force on the spring 40, a base element 44 in the form of a disk is fitted against the right end of the spring, and a connecting pin 45 is slidably mounted in the left end portion of the interior of the stud 42 to serve as a piston moved back and forth by the actuating member 43. The base element 44 has a center pin 47 which fits snugly in a coaxial blind bore 48 in the connecting pin, and thus is mounted for back-and-forth movement with the pin. The spring seats in a recess 49 in the opposite side of the disk, around a retaining stud 50 coaxially mounted in the center of the recess.

Thus, as the actuating member 43 expands, the connecting pin 45 is pushed to the left within the threaded stud 42 to push the base element 44 to the left, and this increases the compression of the spring by an amount determined by the amount of longitudinal movement of the left end of the heat-responsive member. Similarly, as the actuating member is cooled and contracts, the left end thereof moves back to the right and releases the connecting pin and the base element to return to the right and reduce the yieldable valve-closing force exerted by the spring.

To insure full response of the heat-responsive means to both increases and decreases in output temperature, additional return means are provided to shift the base element 44 back to the right upon contraction of the actuating member 43. This avoids any practical possibility of jamming of the connecting pin 45 or the base element after they have been shifted to the left, and thus avoids an inadvertent overloading of the by-pass valve 33 after the output temperature has returned toward the normal operating level.

In this instance, the return means comprise two spring units 51 acting between the partition 29 and the base element 44 in the direction to pull the base element back to the right as the actuating member 43 contracts. These units (one of which is shown in full in FIG. 2) comprise bolts 52 which project loosely through the base element 44 on diametrically opposite sides of the spring recess as shown in FIG. 3, with heads 53 on the bolts abutting against the left side of the base element. The bolts also project loosely through aligned holes in the partition 29, and have nuts 54 threaded onto their left ends, in spaced relation with the partition.

Telescoped onto each bolt 52 between the partition 29 and the associated nut 54 is a coiled spring 55 which is compressed between the partition and the nut to urge the latter to the right. The combined force of these springs thus acts through the nuts and the bolts to urge the base element to the right, and thereby holds the base element against the end of the connecting pin 45. Accordingly, the spring units assist the spring 40 in pushing the pin 45 to the right as the actuating member contracts. As a result, the base element is made fully and positively responsive to both expanding and contracting movement of the actuating member.

From the foregoing, it will be evident that the present invention provides an improved automatic by-pass control which more reliably and effectively regulates the flow through the heater in response to both temperature and pressure changes, and which accomplishes such regulation by means of an improved temperature-responsive actuating member with positive return means, preferably combined with a virtually trouble-free, hinged valve member. It also will be evident that, while a particular form of the invention has been illustrated and described, various modifications may be made without departing from the spirit and scope of the invention.

I claim:

1. In an automatic by-pass flow control for a heater, having an inlet chamber for receiving an input flow of fluid under pressure to be heated and introducing at least part of the input flow to the heater, an outlet chamber for receiving a heated flow of fluid from the heater and delivering the heated flow to a using system, a by-pass chamber for receiving a by-pass flow of excess fluid from said inlet chamber, a by-pass valve controlling the by-pass flow from said inlet chamber to said by-pass chamber, and means yieldably urging said by-pass valve toward the closed position with a preselected force, thereby to maintain a selected pressure level in said inlet chamber, the improvement in a temperature-responsive control for said by-pass valve, comprising:

heat-responsive sensing means disposed in said outlet chamber to be exposed to the temperature of the heated flow of fluid from the heater, and having an actuating member movable back and forth with increases and decreases in said temperature within a given range;

a base element for said urging means movable back and forth to increase and decrease said preselected force on said by-pass valve, thereby to increase and decrease the pressure level maintained in said inlet chamber;

means connecting said actuating member to said base element to move the latter in a direction to increase said force as the actuating member moves in response to an increase in the temperature of said heated flow, whereby such an increase results in reducing the amount of the input flow that is by-passed around the heater;

and return means yieldably urging said base element in a direction to reduce said force as said actuating member moves in response to a decrease in the temperature of said heated flow, thereby to assist said actuating member in reducing said force in order to increase the amount of input flow that is by-passed around the heater.

2. The improvement defined in claim 1 in which said means yieldably urging said by-pass valve toward the closed position is a coiled spring compressed between said base element and said by-pass valve, and said actuating member moves said base element toward said by-pass valve during increases in said temperature.

3. The improvement defined in claim 2 in which said return means comprise at least one spring unit urging said base element away from said by-pass valve.

4. The improvement defined in claim 2 in which said return means comprise two spring units connected to said base element on diametrically opposite sides of said coiled spring, and both yieldably urging said base element away from said by-pass valve.

5. The improvement defined in claim 2 in which said inlet chamber is separated from said by-pass chamber by a partition having a port therein communicating between the chambers, and said by-pass valve comprises a valve plate overlying said port inside said by-pass chamber and hinged on one side of said port for swinging toward and away from said partition.

6. In an automatic by-pass flow control for a heater, comprising a hollow manifold mountable on the heater, spaced partitions in the manifold dividing the latter into an inlet chamber at one end, a central by-pass chamber, and an outlet chamber at the other end, a by-pass port in the partition between the inlet and by-pass chambers, inlet and outlet ports opening from said inlet and outlet chambers to pass fluid between the chambers and the heater, a by-pass valve in said by-pass chamber for controlling the flow through said by-pass port, and a spring yieldably urging said by-pass valve toward said by-pass port to variably restrict the by-pass flow and maintain a selected pressure level in the inlet chamber, the improvement in a temperature-responsive control for said by-pass valve, comprising:

sensing means disposed in said outlet chamber to be exposed to the flow of fluid from the heater, and including a thermally expansible actuating member movable toward said by-pass chamber in response to an increase in temperature, and away from the by-pass chamber in response to a decrease in temperature;

a base element for said spring disposed between said actuating member and said by-pass valve, said spring being compressed between said base element and said by-pass valve, whereby an increase in temperature results in a corresponding increase in the compression of said spring and the closing force exerted on the valve;

and return means acting between said base element and the partition separating said by-pass chamber from said outlet chamber, and urging the base element yieldably toward the outlet chamber to move the base element away from said by-pass valve as the temperature is decreased, thereby to reduce the compression of said spring and the closing force exerted on the valve.

* * * * *